April 21, 1942.  H. T. KRAFT  2,280,636
LATEX RUBBER CASTING
Filed April 17, 1940
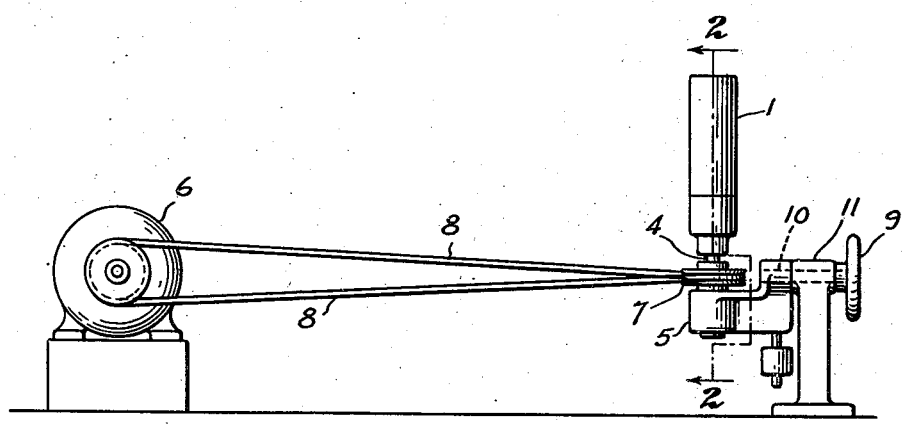
Fig. 1
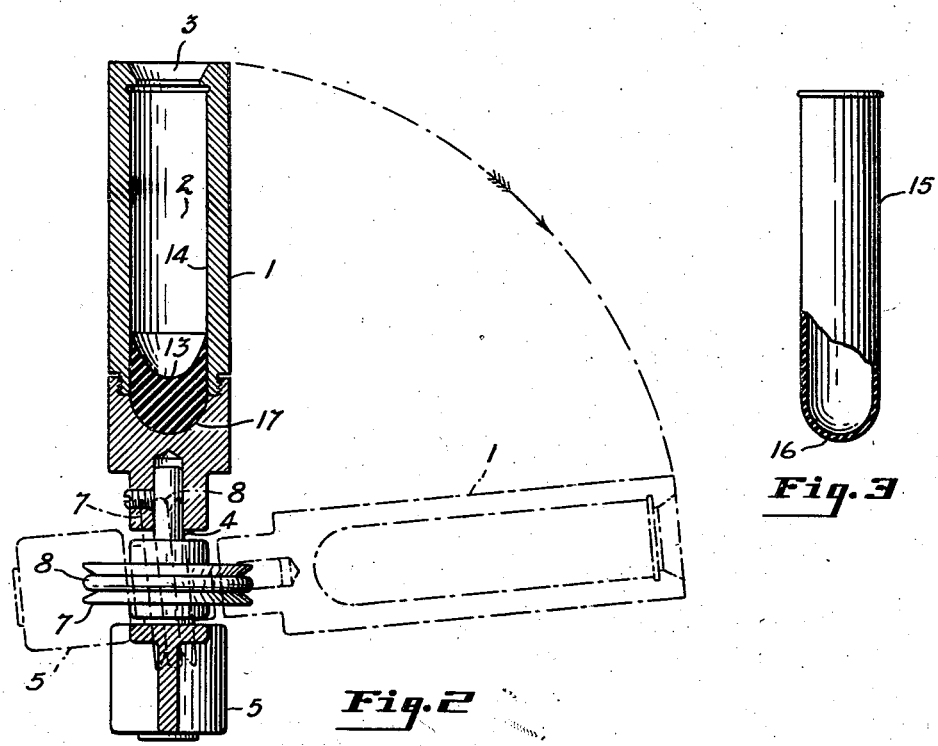
Fig. 2
Fig. 3
INVENTOR
Herman T. Kraft
BY Evans + McCoy
ATTORNEYS Patented Apr. 21, 1942

2,280,636

UNITED STATES PATENT OFFICE 2,280,636

LATEX RUBBER CASTING

Herman T. Kraft, Akron, Ohio, assignor to The General Tire & Rubber Company, Akron, Ohio, a corporation of Ohio Application April 17, 1940, Serial No. 330,134

6 Claims. (Cl. 18—58)

This application is a continuation-in-part of my copending application Serial No. 130,999, filed March 15, 1937, now Patent No. 2,208,868, and this invention relates to a method of forming hollow articles, and particularly to a method for centrifugally casting such articles from a rubber latex.

In the usual method of preparing articles from latex with a separate acidic coagulant, a form is successively dipped in coagulant and then in latex a plurality of times. If a thick layer of latex is applied by a single dipping, as may be the case when a strong coagulant is present on the form, the latex adjacent the form is coagulated and has sufficient strength to support itself, but the latex removed slightly from the form is only a gel and has no strength. The latex must, therefore, be dried to a considerable extent on the form before the article can be removed. Even when the thick layer of latex on the form is again dipped into the coagulant, the gel intermediate the two relatively strong surface skins usually has insufficient strength to allow one to remove the undried article from the form without impairing it.

When hollow rubber articles are formed by dipping a form into a coagulant and then into a rubber latex, the wall thickness of the articles and their weight usually varies considerably.

One method of producing hollow articles having a more definite weight of rubber deposited from latex is set forth in the Kay Patent 1,998,897, issued April 23, 1935. As set forth in this patent, a latex compound is mixed with a gelling agent, such as ammonium chloride, and added to a suitable rotating mold, such as has commonly been used for centrifugally lining bearings, etc. with metals. The gelling agent is an ammonium salt, such as ammonium chloride, nitrate, etc., and acts as a delayed coagulant at room temperature or as a relatively quick coagulant at elevated temperatures. The coagulant, being distributed through the latex, causes coagulation throughout the entire layer of rubber, which assumes the shape of the mold because of centrifugal force.

While this process produces a desirable, uniform article, particularly when the gellation takes place at the lower temperature, the addition of a gelling agent to the latex compound is often undesirable because the entire batch must be used relatively soon after it is mixed if autocoagulation and consequent destruction of the mixed compound are to be avoided.

It is, therefore, an important object of this invention to provide a method for producing rubber articles having a uniform wall thickness and weight.

It is another object of this invention to provide a method for producing hollow articles having a uniform wall thickness from a latex compound which may be stored for extended periods.

A further object of this invention is to provide a method for casting articles, with thick or thin walls, from latex and a separate coagulant, in which method the articles may be removed from the mold without drying them.

Other objects will be apparent from the following description of this invention, as illustrated in connection with the drawing in which:

Figure 1 is an elevational view of suitable apparatus for casting articles having a generally tubular shape, such as a combined stopper and nozzle for acid bottles, the apparatus being in position for receiving the latex;

Fig. 2 is a sectional view taken substantially on the line 2—2 of Fig. 1 and shows a suitable mold for making tubular articles, the vertical position of the mold being shown by solid lines, and a substantially horizontal position being shown by the dotted lines.

Fig. 3 is an elevational view of an article molded centrifugally in the apparatus illustrated in Figs. 1 and 2.

In accordance with the present invention a measured quantity of a rubber dispersion, such as a suitably compounded latex, is incorporated in a rotating mold whereupon the latex is distributed in a uniform layer over the surface of the mold by centrifugal force. A suitable quantity of coagulant, such as an electrolyte or acid solution, is then added to the rotating mold whereupon the latex layer becomes coagulated throughout its entire thickness. Even though both the latex and the coagulant are liquids, it has been found that the centrifugal force acts upon the ingredients of the mold to distribute the coagulant through the latex and form a completely coagulated deposit, even though it is of substantial thickness. The deposit, being uniformly coagulated and having no intermediate gel or liquid portion, has substantial strength and may be immediately removed from the mold by suitable means, washed and dried.

Apparatus suitable for practice of this invention comprises a mold, such for example as the tube mold 1, preferably constructed of aluminum, having a cavity 2 of the desired shape and an open end 3. The mold is provided with means for rotating it about at least one axis. Thus, a mold for the preparation of tubular articles may be rigidly carried on a shaft 4, which is journaled in the frame 5 and which may be driven at a variable speed by means such as the variable speed motor 6, the pulley 7 and the belt 8. The mold 1 is also preferably provided with means, such as the wheel 9 attached to the shaft 10 which is journaled in the frame 11 and which rigidly carries the frame 5, for rotating it about an axis in angular relation to shaft 4.

In the practice of the invention, the mold is rotated slowly with its open end 3 in the vertical position. A measured amount of latex 13 is then inserted into the mold and the rotation increased to distribute the latex over the sides 14 of the mold. In the case of relatively long, tubular articles, it is desirable to also lower or rotate the mold slowly to a substantially horizontal position corresponding to the dotted position of Fig. 2 in order to minimize the effects of gravity. With the mold rotating rapidly in the horizontal position, or rotating at sufficient speed to cause the desired layer of latex to form over the entire inner surface of the mold, a suitable liquid coagulant for the latex is added to the mold as by spraying, whereupon because of the distributive action of centrifugal force the latex layer in the mold becomes coagulated throughout its entire thickness and it may be readily removed, washed and dried, as desired, to form tubular articles, such as illustrated in Fig. 3.

In the preparation of articles having a closed end portion 16, it is desirable to add some coagulant to the mold while it is rotating slowly and before the latex is added. Coagulant coats the lower portion 17 of the mold and this coating acts to coagulate a layer of the added latex before all of it is forced entirely against the side walls 14. Preferably, soon after the latex is added, the speed of the mold is increased and simultaneously the mold is lowered to the horizontal position, illustrated by the dotted lines of Fig. 2.

Although it is unnecessary, it is preferable to coat or spray the entire surface of the rotating mold with coagulant before the latex is added as well as after. The coagulant on the surface of the mold appears to decrease the adhesion of the article to the mold, thus aiding in its removal, and contrary to expectations it does not prevent the uniform distribution of the material over the mold surface.

If desired, the mold may also be heated by suitable means to provide more rapid coagulation of the product.

The following example illustrates the preferred process of the invention:

*Example*

A suitable latex compound containing the usual quantities of vulcanizing agents, accelerators, antioxidants, activators and protective colloids was prepared. The mold, shown by the drawing, was sprayed with a solution of coagulant, such as a solution of sodium nitrate, acetic acid or other electrolyte in either an aqueous or anhydrous solvent, and while rotating slowly a measured quantity of the above compounded latex having no gelling agent was added thereto. The rotation of the mold was accelerated and its position altered so that the latex covered the desired surface. While the mold was still being rotated at high speed in the horizontal position, a suitable quantity of coagulant, such as a 10% solution of acetic acid, was sprayed therein, whereupon the whole of the latex layer was coagulated. The coagulated layer was withdrawn from the mold with a vacuum nozzle, dried and vulcanized. The tubular product had more uniform wall thickness than a similar product formed by dipping.

Since the articles may be removed from the mold substantially immediately after the coagulant has been added and no drying of the article in contact with the form is necessary, the output per mold is much greater than the output of molds wherein the usual digging procedure is used. Since the single coating of coagulant is suitable for coagulating even comparatively thick articles, it will be seen that the cost of the articles is also decreased.

It is to be understood that variations and modifications of the specific device herein shown and described for purposes of illustration may be made without departing from the spirit of the invention.

What I claim is:

1. In a process for producing substantially homogeneous, hollow rubber articles from a rubber latex, the steps which comprise incorporating a suitably compounded rubber latex into a mold having a cavity of suitable shape, rotating the mold about at least one axis to distribute the latex, incorporating a suitable coagulant into the rotating mold to coagulate the latex, and removing the coagulated latex from the mold before it has dried.

2. In a process for producing substantially homogeneous, hollow rubber articles from a rubber latex, the steps which comprise coating at least a portion of the walls of a mold having a cavity of suitable shape with a latex coagulant, incorporating a measured quantity of latex in the mold, rotating the mold to distribute the latex, then incorporating additional coagulant into the rotating mold to coagulate the latex, and removing the coagulated material.

3. In a process for producing substantially homogeneous, hollow rubber articles from a rubber latex, the steps which comprise incorporating a suitably compounded rubber latex into a hot mold having a cavity of suitable shape, rotating the mold about at least one axis to distribute the latex, incorporating a suitable coagulant into the rotating mold to coagulate the latex, and removing the coagulated latex from the mold before it has dried.

4. In a process for producing substantially homogeneous, hollow rubber articles from a rubber latex, the steps which comprise coating at least a portion of the walls of a mold having a cavity of suitable shape with a latex coagulant, incorporating a measured quantity of latex in the mold, rotating the mold to distribute the latex, then incorporating additional coagulant into the rotating mold to coagulate the latex, and removing the coagulated latex before it has dried.

5. In a process for producing substantially homogeneous, hollow rubber articles from a rubber latex, the steps which comprise preparing a curable latex compound which is stable in closed containers, incorporating said compound into a mold having a cavity of suitable shape, rotating the mold about at least one axis to distribute the latex, then incorporating a suitable coagulant into the rotating mold to coagulate the latex, and removing the coagulated latex from the mold before it has dried.

6. In a method of forming substantially homogeneous, hollow, tubular rubber articles from a rubber latex, the steps which comprise incorporating a suitably compounded rubber latex into the cavity of a mold having the general shape of a tube with one open end, rotating the mold about the axis of the tubular portion, shifting the direction of the axis of rotation from substantially the vertical position to substantially the horizontal position to distribute the latex along the tubular walls of the mold, then adding a suitable coagulant to the mold, and removing the coagulated article.

HERMAN T. KRAFT.